United States Patent
Saito

(10) Patent No.: US 9,280,199 B2
(45) Date of Patent: Mar. 8, 2016

(54) IMAGE PROCESSING APPARATUS, PRINTING APPARATUS AND CONTROLLING METHOD IN IMAGE PROCESSING APPARATUS

(75) Inventor: Tadao Saito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 382 days.

(21) Appl. No.: 13/338,628

(22) Filed: Dec. 28, 2011

(65) Prior Publication Data

US 2012/0198102 A1 Aug. 2, 2012

(30) Foreign Application Priority Data

Jan. 31, 2011 (JP) ................................. 2011-019142

(51) Int. Cl.
 *G06F 1/00* (2006.01)
 *G06F 1/32* (2006.01)
 *G06F 13/40* (2006.01)
(52) U.S. Cl.
 CPC ............ *G06F 1/3253* (2013.01); *G06F 1/3284* (2013.01); *G06F 1/3287* (2013.01); *G06F 13/4022* (2013.01); *G06F 2213/0026* (2013.01); *Y02B 60/1235* (2013.01); *Y02B 60/1267* (2013.01); *Y02B 60/1282* (2013.01)
(58) Field of Classification Search
 CPC ... G06F 1/3287; G06F 1/3203; G06F 1/3293; G06F 1/3253; G06F 1/3284
 USPC .............................. 713/320, 323, 324; 710/14
 See application file for complete search history.

(56) References Cited

U.S. PATENT DOCUMENTS

| 5,604,795 | A | 2/1997 | Saito | |
|---|---|---|---|---|
| 5,692,036 | A | 11/1997 | Saito | |
| 6,057,938 | A | 5/2000 | Abe et al. | |
| 6,985,255 | B2 | 1/2006 | Saito | |
| 7,092,113 | B1 | 8/2006 | Saito et al. | |
| 7,564,578 | B2 | 7/2009 | Saito et al. | |
| 7,783,818 | B1 | 8/2010 | Sardella et al. | 710/313 |
| 2005/0246653 | A1* | 11/2005 | Gibson et al. | 715/773 |
| 2006/0114918 | A1* | 6/2006 | Ikeda et al. | 370/408 |
| 2006/0236139 | A1 | 10/2006 | Chang et al. | 713/300 |
| 2006/0277344 | A1 | 12/2006 | Yasui et al. | |
| 2007/0067658 | A1* | 3/2007 | Chandley et al. | 713/320 |
| 2011/0283037 | A1* | 11/2011 | Koga et al. | 710/313 |

FOREIGN PATENT DOCUMENTS

CN   101077663 A   11/2007

* cited by examiner

*Primary Examiner* — Ernest Unelus
(74) *Attorney, Agent, or Firm* — Fitzpatrick, Cella, Harper & Scinto

(57) ABSTRACT

This invention is directed to reducing power consumption even when there is a great amount of power consumed by a root complex in a printing apparatus that employs a PCI Express architecture. To accomplish this, a printing apparatus that includes a controller capable of switching between a root complex and an endpoint and an accelerator controller serving as a root complex performs the following processing. More specifically, in the power saving mode, the power source of the accelerator controller is turned off and the controller is set as a root complex. Power consumption in the power saving mode can be greatly reduced, and a return sequence from the power saving mode can be executed.

21 Claims, 13 Drawing Sheets

F I G. 6

| D STATE OF DOWNSTREAM COMPONENT | PERMISSIBLE D STATE OF UPSTREAM COMPONENT | PERMISSIBLE L STATE |
|---|---|---|
| D0 | D0 | L0, L0s, OR L1 |
| D1 | D0~D1 | L1 |
| D2 | D0~D2 | L1 |
| D3hot | D0~D3hot | L1 |
| D3cold | D0~D3cold | L1~L3 |

F I G. 10
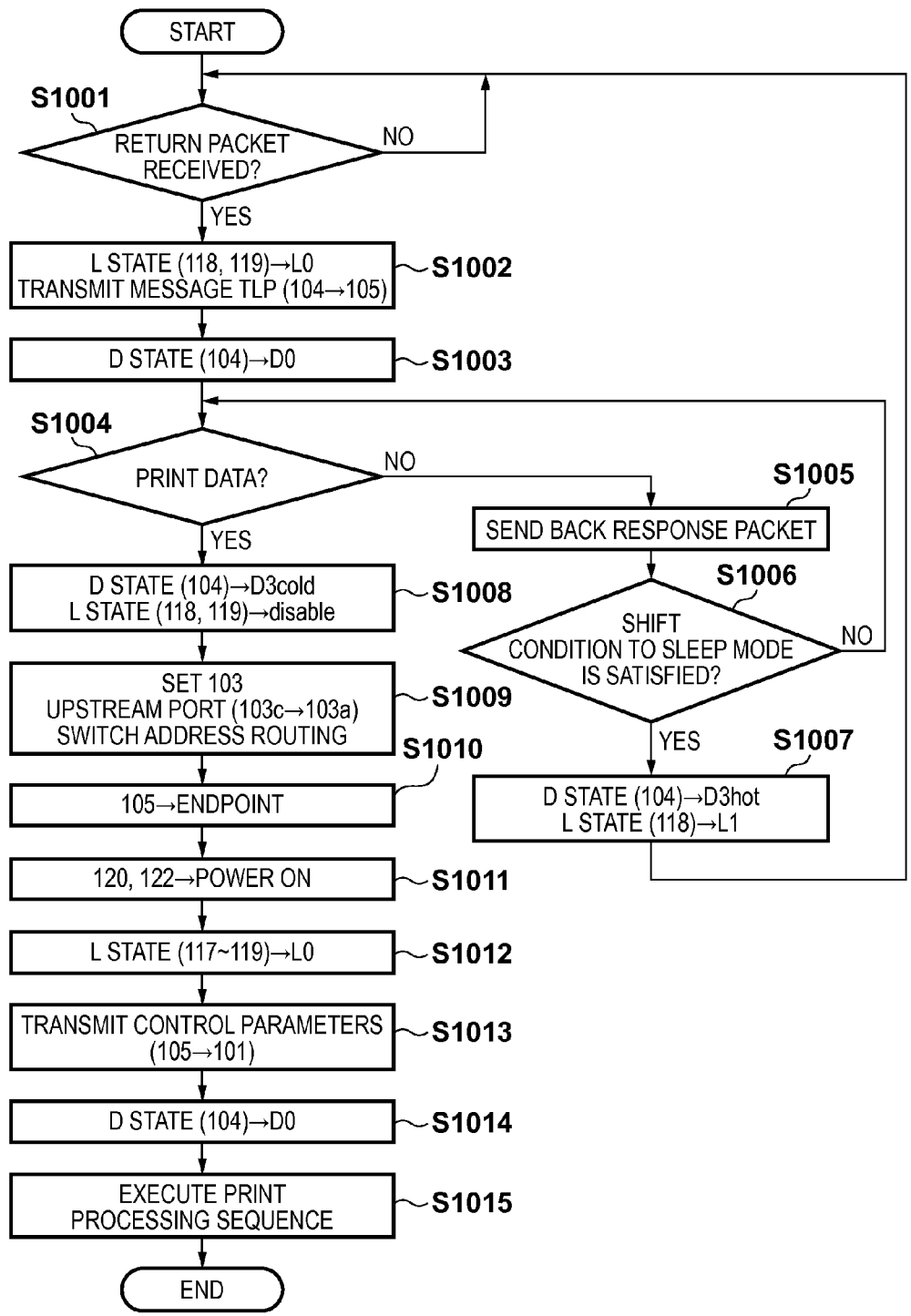

F I G. 13
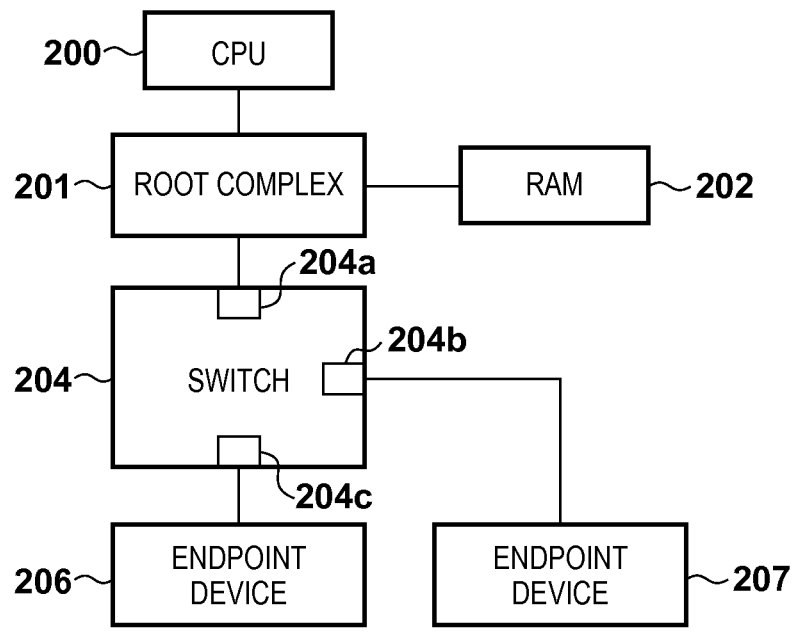
F I G. 14
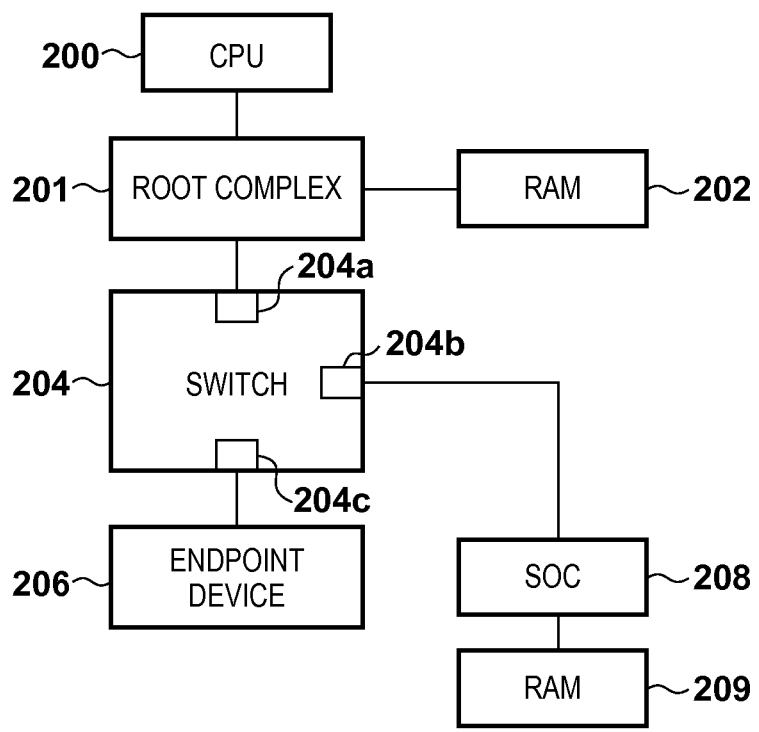

IMAGE PROCESSING APPARATUS, PRINTING APPARATUS AND CONTROLLING METHOD IN IMAGE PROCESSING APPARATUS

BACKGROUND OF THE INVENTION

1. Field of the Invention

The present invention relates to an image processing apparatus, printing apparatus and control method in an image processing apparatus. Particularly, the present invention relates to an image processing apparatus, printing apparatus and control method in an image processing apparatus in a data transfer system which transfers image data.

2. Description of the Related Art

As a high-speed serial interface, a PCI Express® interface, which is a succeeding specification of the PCI bus system, has been proposed (see, for example, U.S. Patent Application Publication Nos. 2006/0114918 and 2006/0277344). A PCI Express serial bus has an effect of reducing the hardware cost because the number of signals is smaller than that in a PCI parallel bus. For example, the number of signal lines on a board can be reduced, and the substrate area and connector size can be decreased. PCI Express can simultaneously provide a bandwidth twice or more that of the PCI and thus can meet demands for higher speed and higher performance.

Since PCI Express employs a point to point connection, extension of the system configuration is implemented by providing port extension at a switch and transferring packets.

FIG. 13 is a block diagram exemplifying a data transfer system using PCI Express.

As shown in FIG. 13, this system includes a CPU 200, a root complex 201, a RAM 202, a switch 204, and endpoint devices 206 and 207. The root complex 201 is the top layer of the PCI Express hierarchy. The root complex 201 connects the CPU 200 and RAM 202, and is connected to the endpoint devices 206 and 207 via the switch 204. The root complex 201 includes a GMCH (Graphics Memory Controller Hub) in a computer system. The endpoint devices 206 and 207 assume interface controller devices (for example, Ethernet® controllers), HDD controllers, or the like.

The root complex side of PCI Express is called an upstream, and the endpoint side is called a downstream. A link is established by transmission/reception for initialization according to the PCI Express protocol. A port 204a of the switch 204 is connected to the root complex 201 and called an upstream port. Ports 204b and 204c of the switch 204 are connected to the endpoint devices 206 and 207, respectively, and called downstream ports.

FIG. 14 is a block diagram showing a system configuration when the endpoint device 207 in the configuration shown in FIG. 13 is replaced with an SOC 208 having a CPU, memory controller, and other processing functions. General-purpose CPUs and root complexes used in a computer and the like can be expected to shorten the development period because the cost performance with respect to their total throughput is high and there are an abundance of available standard libraries. However, they tend to consume a large amount of power.

In view of this, when the system is used in the power saving mode, power supply to the CPU 200, root complex 201, and RAM 202 larger in power consumption than the SOC 208 is stopped. Instead, the SOC 208, which incorporates a CPU, controls the system in the power saving mode, greatly reducing power consumption.

However, the system using PCI Express fails in a configuration access without the root complex device, performs neither power control nor initialization, and cannot shift to the power saving mode.

SUMMARY OF THE INVENTION

Accordingly, the present invention is conceived as a response to the above-described disadvantages of the conventional art.

For example, an image processing apparatus, printing apparatus and control method in the image processing apparatus according to this invention are capable of reducing power consumption using even PCI Express.

According to one aspect of the present invention, there is provided an image processing apparatus including a PCI Express bus, comprising: a first controller configured to perform control of the image processing apparatus and first data processing; a second controller configured to, upon receiving power supply, be activated as a root complex and perform second data processing; a power control unit configured to control power supply to the second controller; a setting unit configured to set the first controller as a root complex when the power control unit stops power supply to the second controller, and set the first controller as an endpoint when the power control unit starts power supply to the second controller in a state where power supply to the second controller stops; and a transfer unit configured to transfer data input from a host to the first controller when the first controller operates as a root complex, and transfer the data to the second controller when the second controller operates as a root complex.

According to another aspect of the present invention, there is provided a controlling method in an image processing apparatus comprising: wherein the image processing apparatus includes: a PCI Express bus system; a first controller configured to perform control of the image processing apparatus and first data processing; a second controller configured to, upon receiving power supply, be activated as a root complex and perform second data processing; and a power control unit configured to control power supply to the second controller, a monitoring step of monitoring data received from a host; a first control step of, in a case where data of a predetermined content has not been received within a predetermined time in the monitoring step, instructing the power control unit to stop power supply to the second controller, and setting the first controller as a root complex; and a second control step of, in a case where data of a predetermined content is received in the monitoring step after the first control step, instructing the power control unit to start power supply to the second controller, and setting the first controller as an endpoint.

The invention is particularly advantageous since even a printing apparatus which adopts a PCI Express architecture for the control configuration can greatly reduce power consumption in the power saving mode and execute a return sequence from the power saving mode.

Further features of the present invention will become apparent from the following description of exemplary embodiments (with reference to the attached drawings).

BRIEF DESCRIPTION OF THE DRAWINGS

FIG. 6 is a table showing the relationship between the device power state (D state) and the link power state (L state).

FIG. 10 is a flowchart showing shift processing from the SLEEP mode to the normal mode.

FIG. 13 is a conceptual block diagram exemplifying a PCI Express architecture configuration.

FIG. 14 is another conceptual block diagram exemplifying a PCI Express architecture configuration.

DESCRIPTION OF THE EMBODIMENTS

An exemplary embodiment of the present invention will now be described in detail in accordance with the accompanying drawings. Note that the configuration disclosed in the following embodiment is merely an illustrative example, and the present invention is not limited to the illustrated configuration.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "printing element" (to be also referred to as a "nozzle") includes an ink orifice or a liquid channel communicating with it, and an element for generating energy used to discharge ink, unless otherwise specified.

<Description of Printing Apparatus (FIGS. 1A to 2)>

Figure 1A:
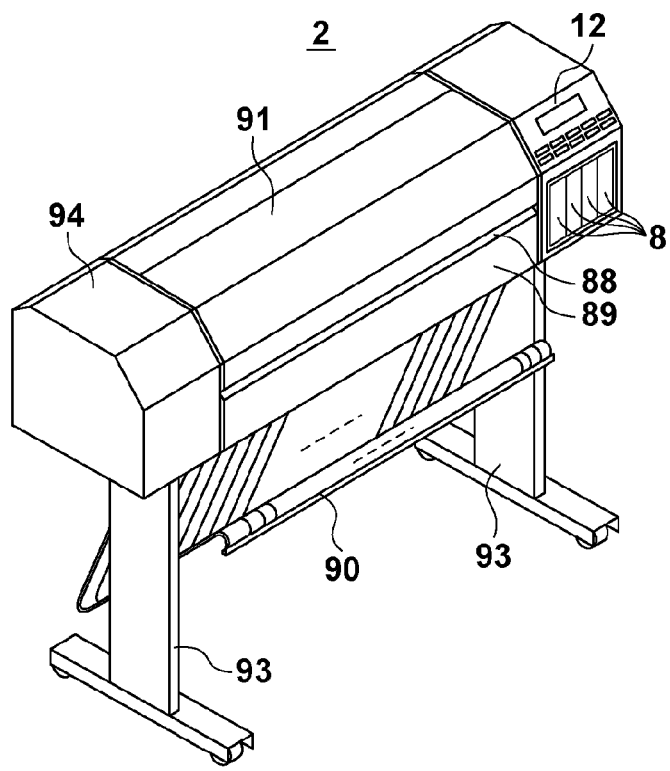
FIGS. 1A and 1B are perspective views showing the main part of the mechanism of an inkjet printing apparatus as a typical embodiment of the present invention.
Figure 1B:
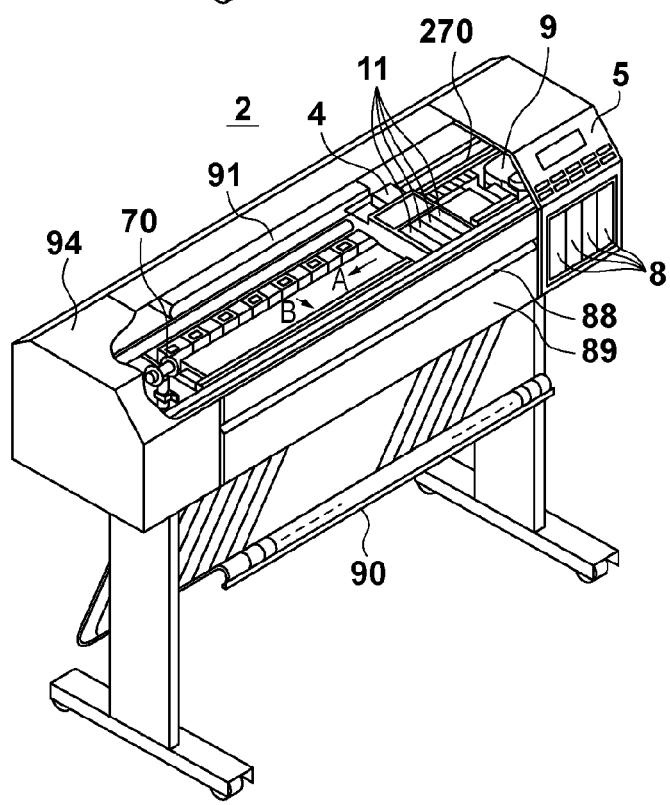

FIGS. 1A and 1B are perspective views showing the outer appearance of an inkjet printing apparatus (to be referred to as a printing apparatus) using A0- and B0-size printing media as a typical embodiment of the present invention. FIG. 1B is a perspective view showing a state in which the upper cover of the printing apparatus shown in FIG. 1A is removed.

As shown in FIG. 1A, a printing apparatus 2 has a manual insertion port 88 on the front surface, and a roll paper cassette 89 which can open to the front side is arranged below the manual insertion port 88. A printing medium such as printing paper is supplied from the manual insertion port 88 or roll paper cassette 89 into the printing apparatus. The printing apparatus 2 includes an apparatus main body 94 supported by two legs 93, a stacker 90 which receives a discharged printing medium, and an openable/closable see-through upper cover 91. An operation panel 12, ink supply units, and ink tanks are arranged on the right side of the apparatus main body 94.

As shown in FIG. 1B, the printing apparatus 2 includes a conveyance roller 70 for conveying a printing medium in a direction (sub-scanning direction) indicated by an arrow B, and a carriage 4 which is guided and supported to be able to reciprocate in directions (indicated by an arrow A: main scanning direction) of width of the printing medium. The printing apparatus 2 further includes a carriage motor (not shown) for reciprocating the carriage 4 in directions indicated by the arrow A, a carriage belt (to be referred to as a belt) 270, and a printhead 11 mounted on the carriage 4. Also, the printing apparatus 2 includes an ink suction recovery unit 9 which supplies ink and eliminates ink discharge failure caused by clogging of the orifice of the printhead 11 or the like. The operation panel 12 includes an input key 5 to input an instruction from the user.

In this printing apparatus, the carriage 4 supports the inkjet printhead (to be referred to as printhead) 11 formed from four heads in correspondence with four color inks to print in color on a printing medium. More specifically, the printhead 11 includes a K (black) head for discharging K ink, a C (Cyan) head for discharging C ink, an M (Magenta) head for discharging M ink, and a Y (Yellow) head for discharging Y ink.

When printing on a printing medium using the above arrangement, the conveyance roller 70 conveys a printing medium to a predetermined printing start position. Then, the carriage 4 scans the printhead 11 in the main scanning direction, and the conveyance roller 70 conveys the printing medium in the sub-scanning direction. By repeating these operations, the printing apparatus prints on the entire printing medium.

More specifically, the belt 270 and carriage motor (not shown) move the carriage 4 in the directions indicated by the arrow A shown in FIG. 1B, thereby printing on a printing medium. The carriage 4 then returns to a position (home position) before scanning, and the conveyance roller conveys the printing medium in the sub-scanning direction (direction indicated by the arrow B shown in FIG. 1B). After that, the carriage scans again in the directions indicated by the arrow A in FIG. 1B. In this manner, an image, character, or the like is printed on the printing medium. After this operation is repeated to end printing of one printing medium, the printing medium is discharged into the stacker 90, completing printing of one printing medium.

Figure 2:
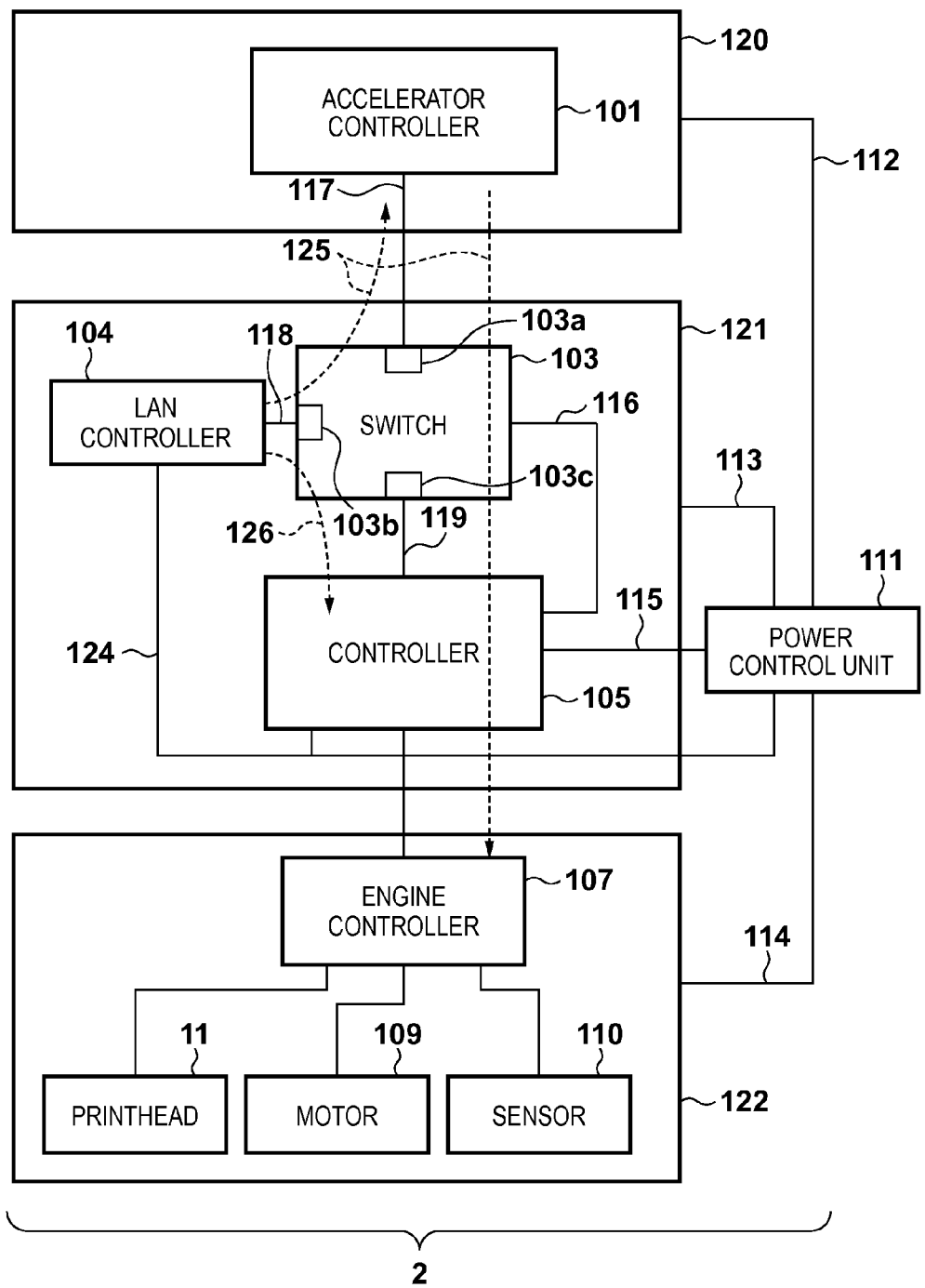
FIG. 2 is a block diagram showing the control configuration of the printing apparatus shown in FIG. 1.

FIG. 2 is a block diagram showing the control configuration of the printing apparatus shown in FIG. 1.

As shown in FIG. 2, the printing apparatus 2 includes an accelerator 120, a printer controller 121, a printer engine 122, and a power control unit 111 which controls power supply to these units. The printing apparatus uses a control configuration which adopts a PCI Express architecture.

The printer controller 121 which controls the overall apparatus includes a LAN controller 104, switch 103, and controller 105. The LAN controller 104 (interface circuit) is a PCI Express endpoint device which enables communication with an external device via a LAN interface. In other words, the LAN controller 104 is a transfer circuit which receives data from an external device and transfers it to the controller 105 and an accelerator controller 101. The switch 103 is a PCI Express switch which connects a PCI Express device serving as each processing node. Each PCI Express device is connected to the following three transmission paths: a transmission path 117 between the accelerator controller 101 and the switch 103, a transmission path 118 between the LAN controller 104 and the switch 103, and a transmission path 119 between the controller 105 and the switch 103.

A port 103a of the switch 103 is connected to the accelerator controller 101 serving as a root complex, and set as an upstream port. Ports 103b and 103c of the switch 103 are connected to the LAN controller 104 and controller 105 serving as endpoints, respectively, and set as downstream ports. The switch 103 can be set from the controller 105 via a serial bus (SMbus) 116.

The controller 105 has the functions of a CPU, PCI Express endpoint, RAM, ROM, and image processing unit. The controller 105 is connected to the switch 103 and an engine controller 107, and controls image processing and the printer controller. In the controller 105, an SOC (System On Chip) which incorporates a CPU, a RAM, and a ROM may be configured as discrete devices. In this case, the SOC serves as a PCI Express endpoint. The PCI Express unit of the controller 105 includes a register, and the root complex and endpoint are switchable based on the register setting.

The accelerator 120 includes the accelerator controller 101. The accelerator controller 101 includes a CPU, PCI Express root complex, RAM, ROM, and encryption unit, and is connected to the switch 103. In the accelerator controller 101, an MCH (Memory Controller Hub), CPU, RAM, and ROM may be configured as discrete devices. In this case, the MCH serves as a PCI Express root complex. The accelerator controller 101 is higher in CPU performance and memory performance than the controller 105. The accelerator controller 101 performs interface processing and image processing requiring a high ratio of software control, and supports processing of the controller 105.

The printer engine 122 includes the engine controller 107, the printhead 11, a motor 109, and a sensor 110, and has the overall arrangement shown in FIGS. 1A and 1B.

The power control unit 111 supplies power to respective apparatus units such as the accelerator 120, printer controller 121, and printer engine 122 via power supply lines 112, 113, and 114. The controller 105 controls the power control unit 111 via a power control line 115.

Power is supplied to the LAN controller 104 and power control unit 111 separately from the power supply lines 112, 113, and 114. The LAN controller 104 supplies a WAKE# signal 124 to the controller 105 and power control unit 111.

An outline of the printing operation in the printing apparatus 2 will now be explained.

In FIG. 2, a dotted arrow 125 indicates the flow of print data. A host computer (to be referred to as a host) transmits print data to the printing apparatus 2. The host and printing apparatus 2 are connected via a LAN cable, and print data is sent to the accelerator controller 101 via the LAN controller 104 and switch 103. The accelerator controller 101 performs processes such as reception processing, decryption processing, and interpretation of a page description language. Then, the accelerator controller 101 transmits the print data to the controller 105 via the switch 103.

The controller 105 converts R, G, and B multi-valued color component data sent from the accelerator controller 101 into C, M, Y, and K binary color component data, and transfers the C, M, Y, and K binary color component data to the engine controller 107. C, M, Y, and K correspond to cyan, magenta, yellow, and black ink colors. The motor 109 includes a carriage motor which moves, in the scanning directions (arrow A in FIG. 1), the carriage 4 supporting the printhead 11, and the conveyance motor which conveys a printing medium in the conveyance direction (arrow B in FIG. 1). While moving the carriage 4 and printing medium by the motor 109 using information from the sensor 110, the engine controller 107 transfers binary print data to the printhead 11 to print on the printing medium.

<Description of Outline of PCI Express Specification>

The above-described printing apparatus uses a PCI Express® high-speed serial bus. As a premise of the embodiment, an outline of the PCI Express specification will be explained while referring to the descriptions of U.S. Patent Application Publication Nos. 2006/0114918 and 2006/0277344 mentioned above.

Figure 3:
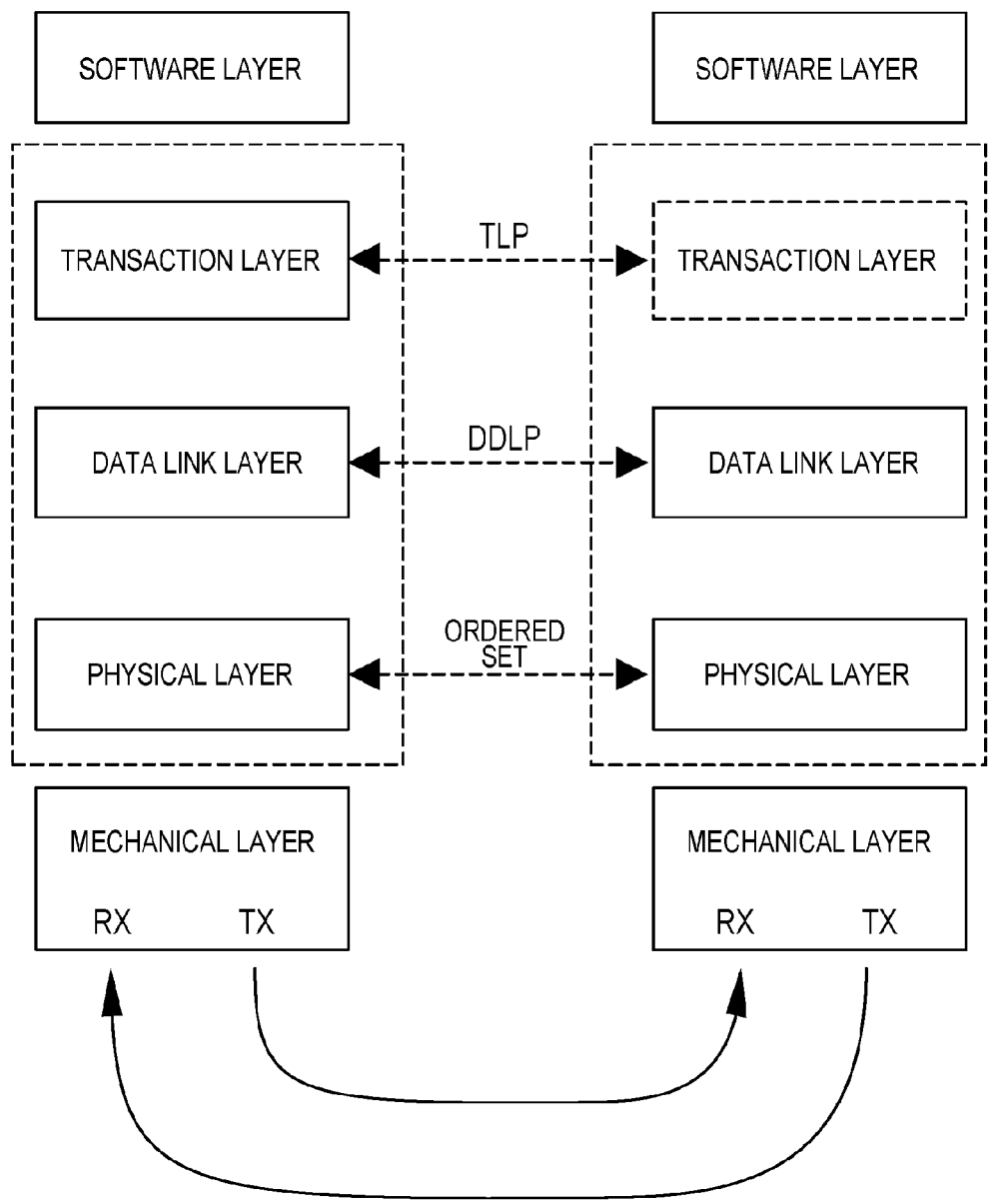
FIG. 3 is a block diagram showing a state in which two components are connected using PCI Express, and a PCI Express layer structure.

The contents of PCI Express features are as follows:
serial communication by point to point connection
differential low voltage signaling
fine power control
packet-based protocol
connection between a plurality of devices by a switching device
wide data bandwidth, high expandability, and high flexibility
error detection by CRC and data coding
PCI-compatible software model and address space FIG. 3 is a block diagram showing a state in which two components are connected using PCI Express, and a PCI Express layer structure.

The physical layer initializes a link between two components on the link, and manages the low-level operations of data transfer and power-saving functions. The data link layer provides the transaction layer with a reliable data transfer service and a communication mechanism capable of flow control and power link management with low overhead. Data packets generated and consumed in the data link layer are called data link layer packets (DLLPs). The transaction layer generates and consumes data packets used for implementation of a load/store data transfer mechanism. Further, the transaction layer manages flow control of these packets between two components on the link. Data packets generated and consumed in the transaction layer are called transaction layer packets (TLPs).

Figure 4:
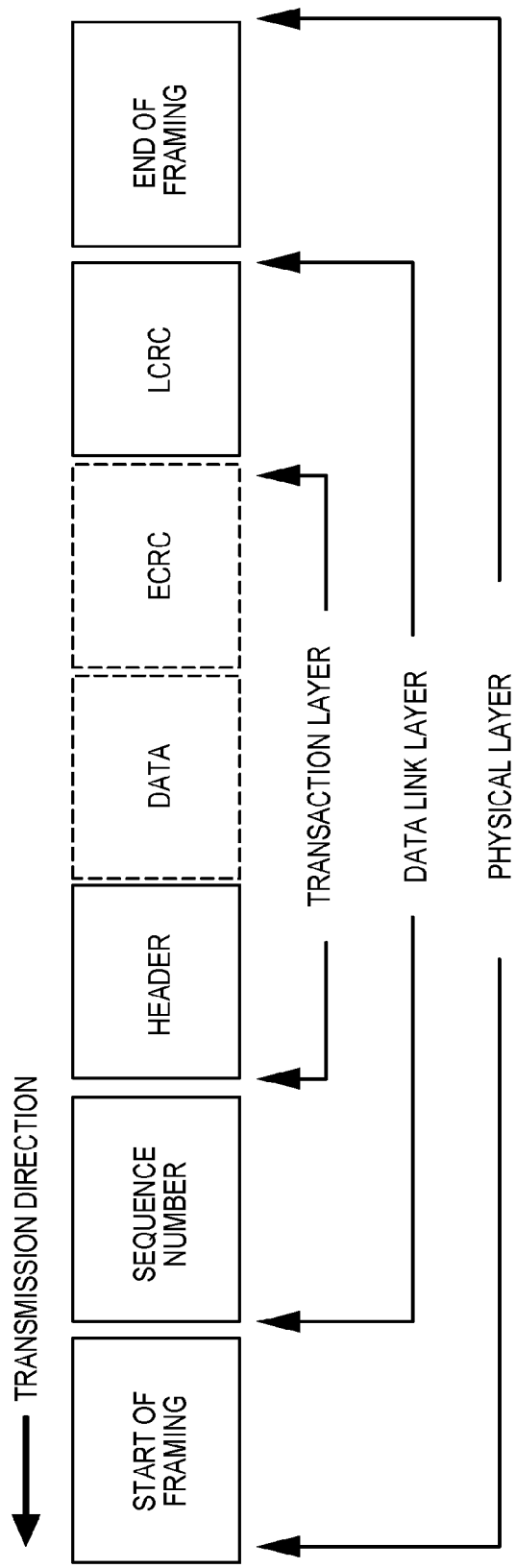
FIG. 4 is a view showing a state in which a TLP structure generated in the transaction layer is corrected until it is transferred through the data link layer and physical layer.

FIG. 4 is a view showing a state in which a TLP structure generated in the transaction layer is corrected until it is transferred through the data link layer and physical layer.

In FIG. 4, a header indicates the type of packet. In some TLPs, data follows the header and ECRC is added after the data. When a packet to which the transaction layer adds the header and ECRC is transferred to the data link layer, the data link layer adds a sequence number and LCRC.

The data link layer on the receiving side uses the sequence number to confirm whether all packets have arrived, and LCRC to confirm whether the contents of the packet have not changed. Finally, the TLP is transferred to the physical layer. The physical layer converts the TLP from a byte sequence of 8 bits into a symbol sequence of 10 bits, and adds framing symbols to the start and end.

The symbol sequence is transmitted to another component via a link, and pieces of information added to the TLP are removed in an order reverse to that on the transmitting side. In link establishment upon power-on, reset, or the like, the physical layer performs initialization called a training sequence. Then, the data link layer performs flow control initialization.

Figure 5:
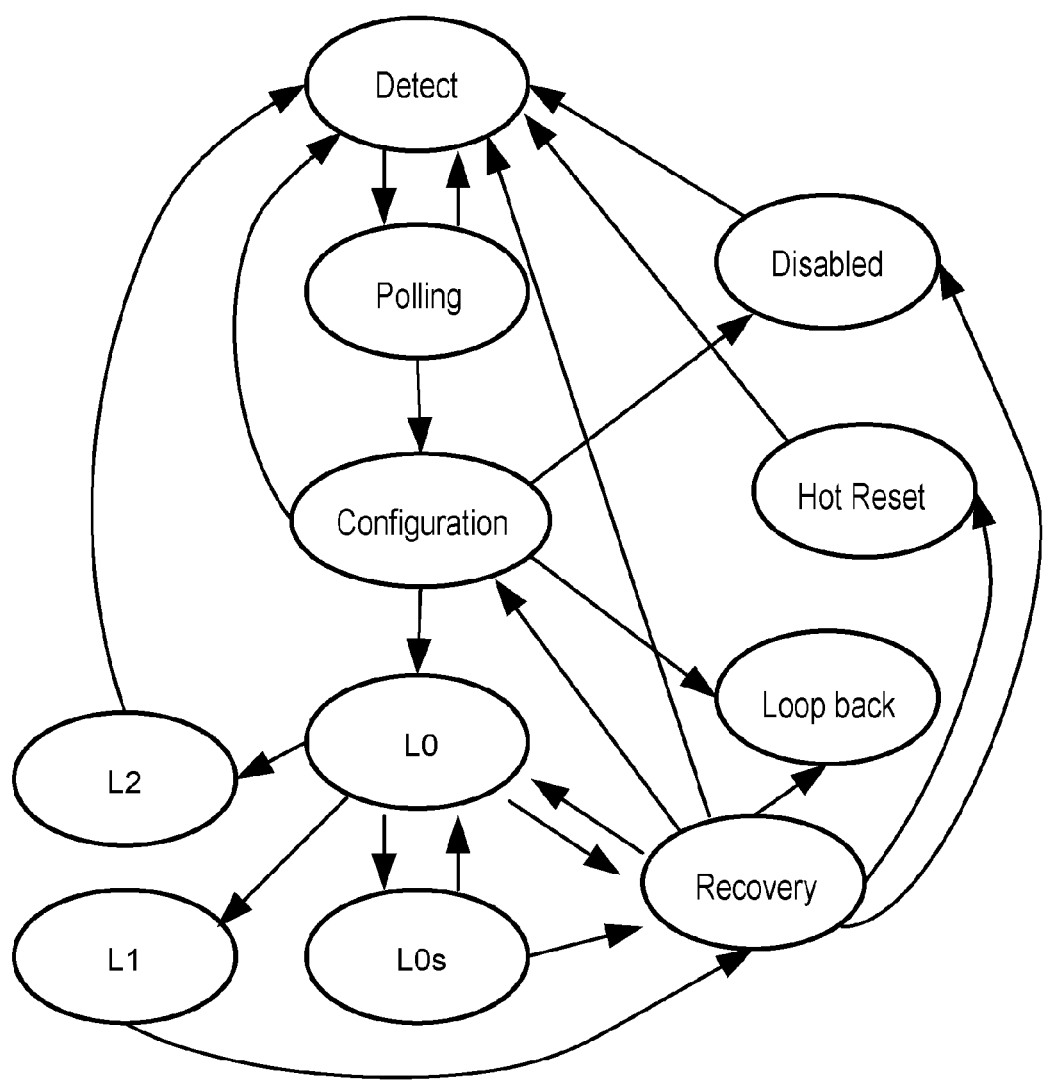
FIG. 5 is a state diagram showing an LTSSM.

FIG. 5 is a diagram showing the state of an LTSSM (Link Training and Status State Machine). A printing apparatus incorporating the state machine performs state management including link initialization, training, and recovery from an error. The link training aims at determination of the number of lanes and establishment of a link. The link training starts from a connected device "Detect" state, and determines link numbers, the number of lanes, and lane numbers.

The training sequence transfers an ordered set of signals between physical layers, and automatically determines the link width, link data rate, and the like without using software. The training sequence starts from, for example, the "Detect" state.

After the link training ends normally, flow control initialization automatically starts. In flow control initialization, credits between links are communicated to recognize the buffer capacities of the partners. After the end of this sequence, a link-up state is set, enabling communication of a TLP.

Respective states will be described below.

"Detect" State

In the "Detect" state, a remote receiver is detected. If a receiver is detected, the state shifts to the "Polling" state.

"Polling" State

Bit synchronization and symbol synchronization are established by transmitting/receiving an ordered set. Also, the lane polarity is detected, and the data rate is finalized.

"Configuration" State

The lane configuration of a link is established by transmitting/receiving an ordered set. If lane disable or loopback is designated, the "Configuration" state shifts to the designated state (Disabled state). If the "Configuration" state normally ends, it shifts to the "L0" state.

"Recovery" State

A link is recovered.

"L0" State

The "L0" state is a normal operation state in which control packets and data packets can be transmitted/received. All power control states ("L0s"/"L1"/"L2") start from the "L0" state.

"L0s" State

The "L0s" state is defined to reduce power consumption, and the state can switch quickly between the "L0s" and "L0" states without passing through the "Recovery" state.

"L1" State

Power consumption can be reduced much more than in the "L0s" state. However, the "L1" state needs to pass through the "Recovery" state to return to the "L0" state. Transition to the "L1" state is performed based on an instruction from the data link layer and an ordered set.

"L2" State

Power consumption can be reduced much more than in the "L1" state. In this state, a transmitter and receiver stop their functions, and neither the main power source nor clock is guaranteed. Thus, transition to the "L0" state starts from the "Detect" state. Transition to the "L2" state is performed based on an instruction from the data link layer and an ordered set.

"Disabled" State

When a link is set disabled, and disable is designated from a higher layer or "Link Disabled" is set by an ordered set, the state shifts to the "Disabled" state.

"Loopback" State

The "Loopback" state is defined for a test and fault isolation.

FIG. 6 is a table showing the relationship between the device power state (D state) and the link power state (L state). As shown in FIG. 6, the PCI Express specification defines control of the power state of a component in several stages (D0 to D3cold) from a complete ON state to a complete OFF state. Respective states will be described in brief.

(D0 State)

A device is completely active and can respond. A link power state corresponding to the D0 state is L0, L0s, or L1.

(D1 and D2 States)

The D1 and D2 states can expect a power saving effect between D0 and D3cold, and a corresponding link power state is L1.

(D3hot State)

In the D3hot state, a component merely stops without turning off the main power source. Clock disabling using a CLKREQ# signal is supported, and a corresponding link power state is L1. As for TLPs, only a configuration and message can be accepted.

(D3cold State)

In the D3cold state, the main power source is turned off. When an auxiliary power source is connected to a device which supports wake enable logic, the link power state corresponds to L2. The use of a sideband WAKE# is recommended to support wake enable logic.

Figure 7:
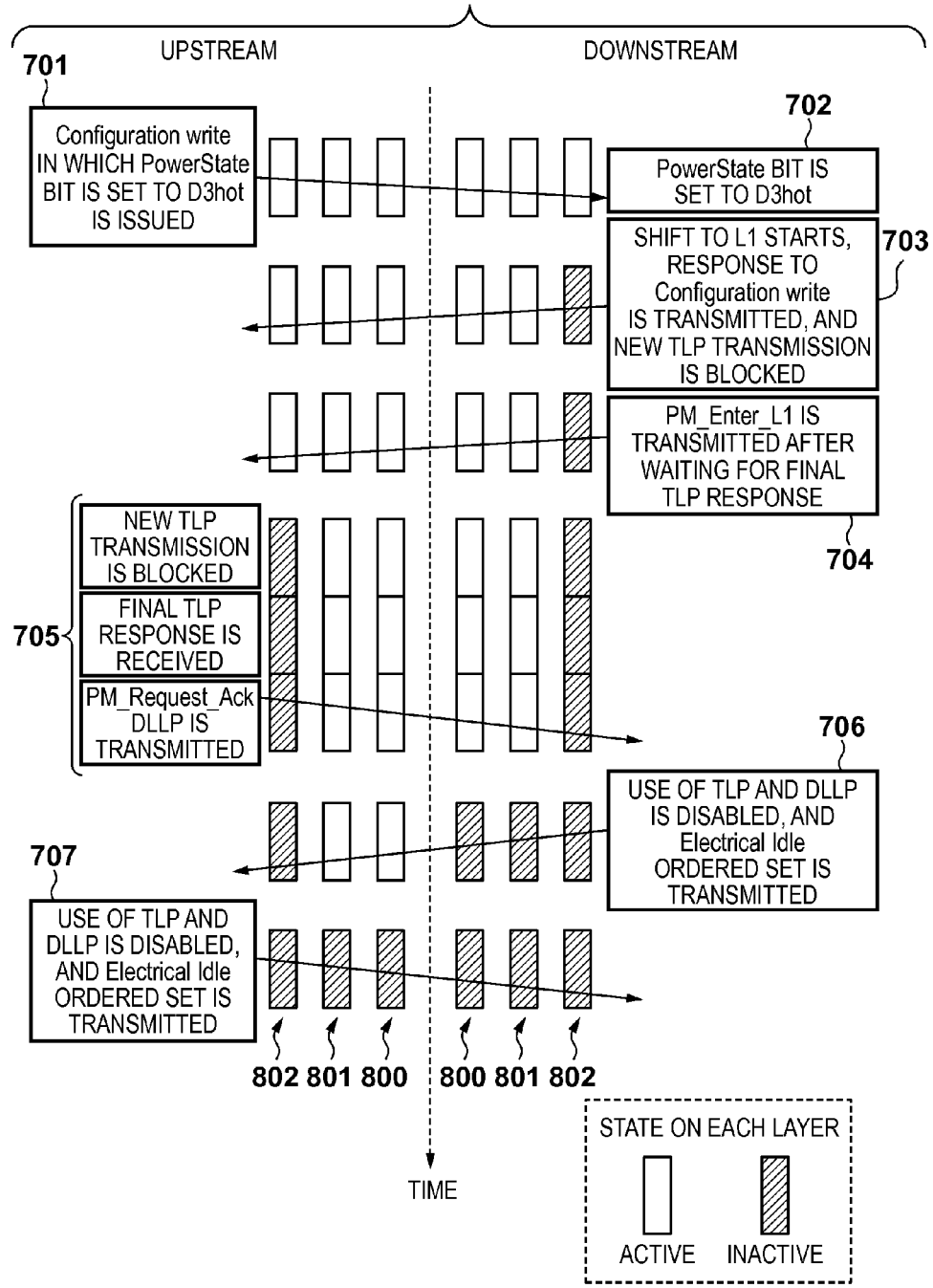
FIG. 7 is a view showing procedures to set an endpoint serving as a downstream to the D3hot device power state from a root complex serving as an upstream.

FIG. 7 is a view showing procedures to set an endpoint serving as a downstream to the D3hot device power state from a root complex serving as an upstream. The root complex issues a configuration write request TLP in which the PowerState bit is set to D3hot (701).

The endpoint receives the configuration write request TLP, and sets the PowerState bit of a configuration register to D3hot (702).

The endpoint starts shifting to L1, transmits a response packet to the configuration write request, and blocks a new TLP transmission (703).

After waiting for the final TLP response, the endpoint transmits a power control DLLP PM_Enter_L1 to the root complex (704).

Upon receiving the DLLP PM_Enter_L1, the root complex blocks the new TLP transmission, and after waiting for the final TLP response, transmits a power control DLLP PM_Request_Ack to the endpoint (705).

Upon receiving the DLLP PM_Request_Ack, the endpoint disables the use of the TLP and DLLP, and transmits an Electrical Idle ordered set (706).

Upon receiving the Electrical Idle ordered set, the root complex disables the use of the TLP and DLLP, and transmits an Electrical Idle ordered set (707).

In this way, the device power state of the endpoint shifts to D3hot, and the link power state shifts to L1.

A case in which the endpoint changes from the D3hot state to the D0 state will now be explained.

First, a condition to change from the D3hot state to the D0 state occurs in the endpoint.

The endpoint originates an ordered set, and the root complex also transmits a corresponding ordered set. In response to this, the L state shifts from the L1 state to the L0 state via the Recovery state, as shown in FIG. 5. The endpoint transmits a message (TLP) regarding power management to the root complex. The root complex issues, to the endpoint, a configuration write request TLP in which the PowerState bit is set to D0. In response to this, the endpoint changes to the D0 state.

Figure 8:
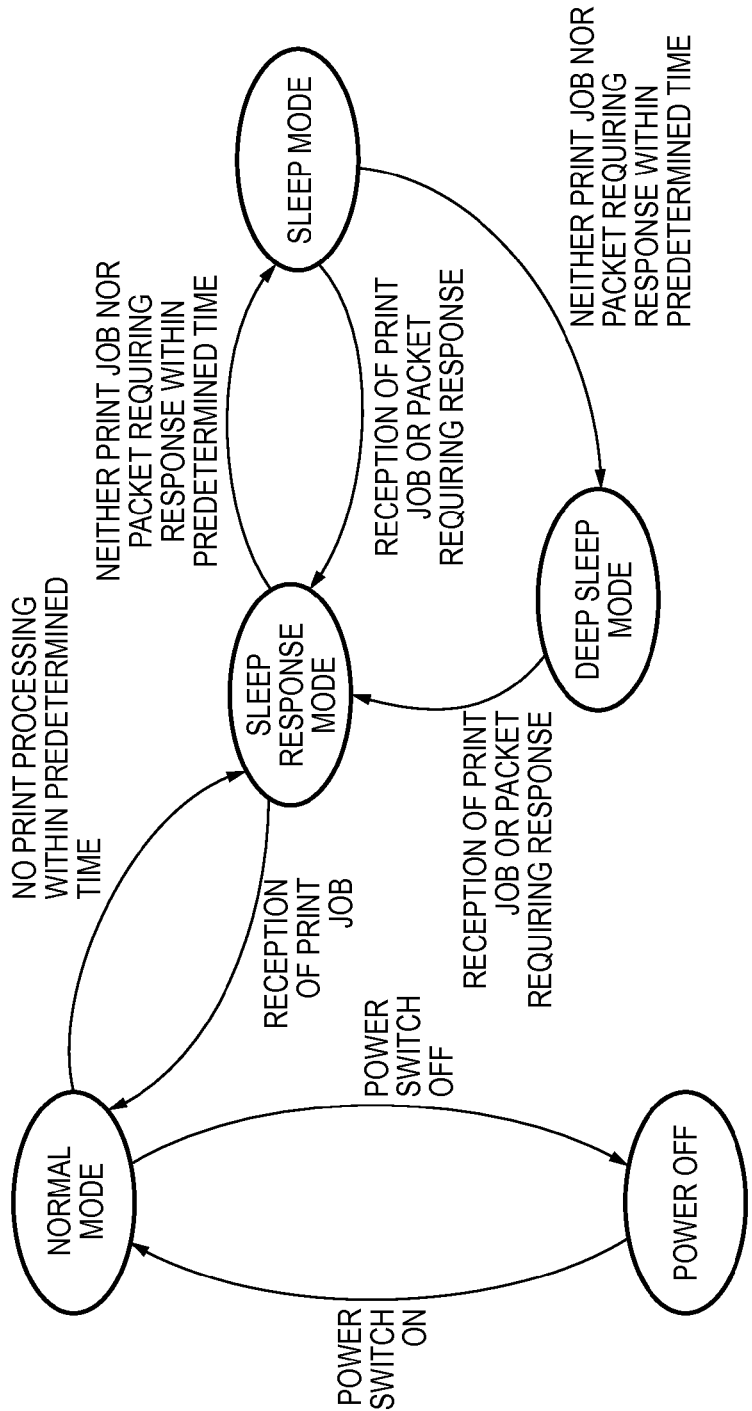
FIG. 8 is a state diagram showing a power consumption mode.

FIG. 8 is a state diagram showing a power consumption mode.

As shown in FIG. 8, the power consumption mode includes a normal mode (first mode), SLEEP response mode, SLEEP mode (second mode), DEEP SLEEP mode (third mode), and power OFF state. When a power switch arranged on the operation panel 12 is turned on while power is supplied to the printing apparatus 2 via an AC power cable, the power consumption mode shifts from the power OFF state to the normal mode. When the power switch is turned off, the power consumption mode shifts from the normal mode to the power OFF state. Upon turning on the power switch, the power control unit 111 supplies power to the controller 105 and accelerator controller 101.

<Change of Operation Mode>

Figure 9:
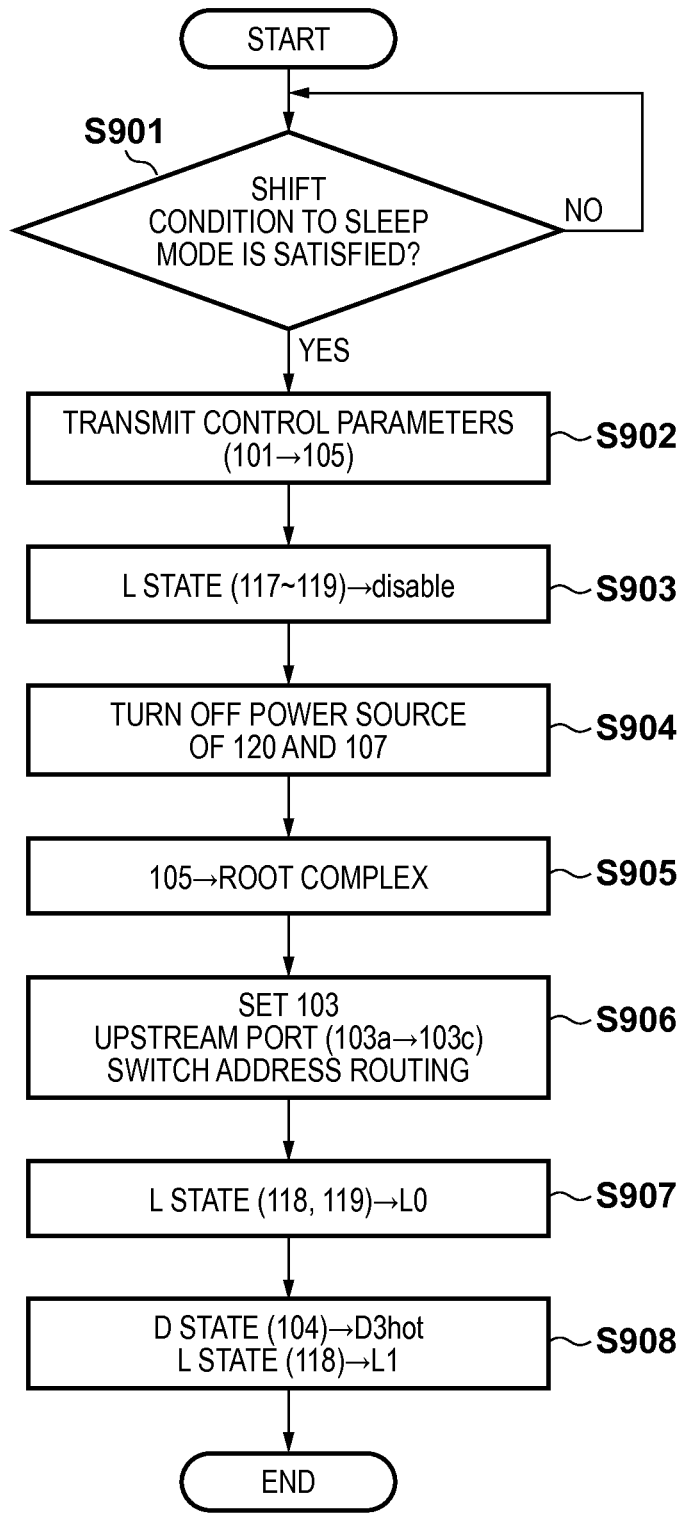
FIG. 9 is a flowchart showing shift processing from the normal mode to the SLEEP mode.

(1) Normal Mode→SLEEP Response Mode→SLEEP Mode (FIG. 9)

A shift sequence when entering the SLEEP mode from the normal mode via the SLEEP response mode will be explained with reference to a flowchart. FIG. 9 is a flowchart showing a sequence when entering the SLEEP mode from the normal mode via the SLEEP response mode.

In step S901, if neither print data nor a packet requiring a response such as an ARP packet has been received or no operation has been performed on the printing apparatus 2 within a predetermined time set in the printing apparatus 2, it is determined that a condition to shift to the SLEEP mode has been satisfied. Then, the printing apparatus 2 starts processing to enter the SLEEP mode.

In step S902, the accelerator controller 101 transfers an Ethernet® IP address, address table information, and the like to the controller 105. In step S903, the accelerator controller 101 sets the link state of the PCI Express transmission path 117 to "disable". Since the upstream port of the switch 103 shifts to "disable", even the downstream port shifts to "disable". Hence, even the link states of the PCI Express transmission paths 118 and 119 shift to "disable".

In step S904, the accelerator 120 and printer engine 122 execute a power OFF sequence. The controller 105 controls the power control unit 111 via the power control line 115 to stop power supply via the power supply lines 112 and 114. As a result, the accelerator 120 and printer engine 122 shift to the power OFF state.

In step S905, the controller 105 makes a root complex setting in the register of its PCI Express unit. In step S906, the controller 105 changes, with respect to the switch 103 via the serial bus 116, the setting of the port 103c of the switch 103 to an upstream port and that of the port 103a to a downstream port. By changing the address routing setting of the switch 103, the controller 105 can receive a TLP from the LAN controller 104.

In step S907, the controller 105 serves as a root complex, and performs the training sequence and flow control initialization. The PCI Express transmission paths 118 and 119 are linked up, and the link state changes to L0. In this state, the operation mode temporarily shifts to the SLEEP response mode.

In step S908, the controller 105 controls the LAN controller 104 to change the device state to D3hot, as described with reference to FIG. 8. The link state of the transmission path 118 shifts to L1 by processing between the LAN controller 104 and the switch 103. The controller 105 controls the switch 103 to change to D3hot. In response to this, the device state of the switch 103 changes to D3hot, and the transmission path 119 shifts to L1. In this state, the operation mode shifts to the SLEEP mode.

After the shift to the SLEEP mode, no power is supplied to the accelerator and printer engine of the printing apparatus, reducing power consumption of the printing apparatus.

(2) SLEEP Mode→SLEEP Response Mode→Normal Mode and SLEEP Mode→SLEEP Response Mode→SLEEP Mode (FIG. 10)

Response processing to a host interface and handling of a print job in the SLEEP mode will be described with reference to a flowchart. FIG. 10 is a flowchart showing response processing to a host interface in return from the SLEEP mode.

In step S1001, the link states of the transmission paths 118 and 119 are L1, and the device states of the switch 103 and LAN controller 104 are D3hot. At this time, assume that the LAN controller is set to return from D3hot if it receives a packet addressed to the printing apparatus 2 or a WAKEUP packet. If the LAN controller 104 receives a LAN packet from the host and the packet is addressed to the printing apparatus 2 or is a WAKEUP packet, the process shifts to step S1002; otherwise, the packet is ignored and the process waits for a packet addressed to the printing apparatus 2 or a WAKEUP packet.

In step S1002, the link state of the transmission path 118 shifts from L1 to L0 in response to a request from the LAN controller 104, and that of the transmission path 119 shifts from L1 to L0 in response to a request from the switch 103. The LAN controller 104 transmits, to the controller 105, a PME message which is a message TLP regarding power control.

In step S1003, upon receiving the PME message, the controller 105 shifts the device state of the LAN controller 104 to D0 by a configuration access. In this state, the operation mode shifts to the SLEEP response mode.

In step S1004, the controller 105 confirms the contents of data and commands contained in the packet received by the LAN controller 104. If the packet contents indicate a print job, the process shifts to step S1008; if NO in step S1004, to step S1005. Note that a dotted arrow 126 in FIG. 2 indicates the flow of data of a LAN packet in the SLEEP response mode.

If the contents of data and commands contained in the packet that have been confirmed in step S1004 indicate a packet (for example, an ARP packet to perform address resolution or an SNMP packet to monitor and control a communication device connected to the LAN) other than a print job, the controller 105 sends back a response packet in step S1005. In step S1006, it is determined whether a LAN packet has been received or an operation has been performed on the printing apparatus 2 within a predetermined time. In other words, it is determined whether a condition to return to the SLEEP mode has been satisfied. If this condition has been satisfied, the process advances to step S1007 and the printing apparatus 2 starts processing of entering the SLEEP mode. In step S1007, the device state of the LAN controller 104 shifts to D3hot, and the link states of the transmission paths 118 and 119 shift to L1, similar to steps S907 and S908. Thereafter, the process returns to step S1001.

If the contents of data contained in the packet that have been confirmed in step S1004 indicate a print job, the controller 105 sets the device state of the LAN controller 104 to D3 cold and the link state of the PCI Express transmission path 119 to "disable" in step S1008. Since the upstream port of the switch 103 shifts to "disable", even the downstream port shifts to "disable". Thus, even the link state of the PCI Express transmission path 118 shifts to "disable".

In step S1009, the controller 105 changes, with respect to the switch 103 via the serial bus 116, the setting of the port 103a of the switch 103 to an upstream port and those of the ports 103b and 103c to downstream ports. By changing the address routing setting of the switch 103, the accelerator controller 101 can receive a TLP from the LAN controller 104.

In step S1010, the controller 105 makes an endpoint setting in the register of its PCI Express unit. By this setting, the controller 105 serves as an endpoint. In step S1011, the controller 105 controls the power control unit 111 via the power control line 115 to start power supply via the power supply lines 112 and 114, turning on the accelerator 120 and printer engine 122. The accelerator 120 and printer engine 122 execute initialization sequences respectively. The accelerator 120 performs initialization for power-on and serves as a root complex.

In step S1012, the accelerator 120 shifts the link states of the transmission paths 117, 118, and 119 to L0, similar to power-on. In step S1013, the controller 105 transfers Ethernet® IP addresses, address table information, and reception packet to the accelerator controller 101. In step S1014, the accelerator 120 performs a configuration access and initialization with respect to the LAN controller 104, changing the device state of the LAN controller 104 to D0. In step S1015, the accelerator controller 101 processes the LAN packet of the print job and performs print processing.

In this fashion, upon receiving a print job or a packet requiring a response, the operation mode can quickly return from the SLEEP mode to the normal mode. When neither a print job nor a packet requiring a response has been received within a predetermined time, the operation mode can shift again to the SLEEP mode, reducing power consumption.

As summarized, the printer controller 121 includes a setting means for setting the controller 105 as a root complex when the power control unit 111 stops power supply to the accelerator 120, and setting the controller 105 as an endpoint when the power control unit 111 starts power supply to the accelerator 120 while power supply to the accelerator 120 stops.

Also, the printer controller 121 includes a transfer means for transferring data input from a host to the controller 105 when the controller 105 operates as a root complex, and transferring data input from the host to the accelerator controller 101 when the accelerator controller 101 operates as a root complex.

Figure 11:
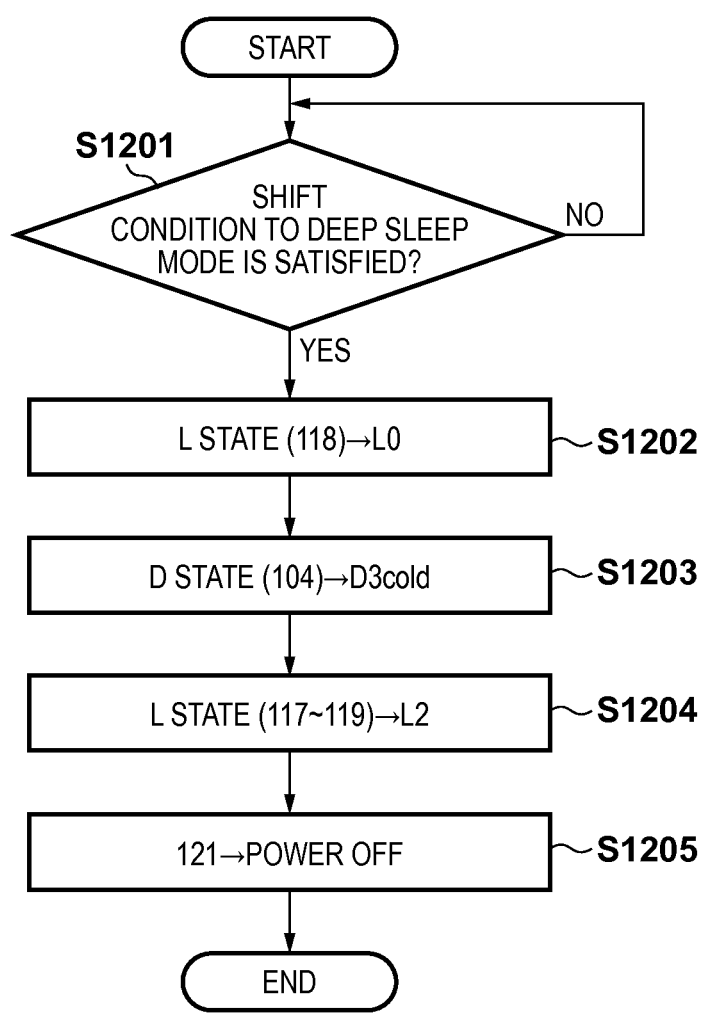
FIG. 11 is a flowchart showing shift processing from the SLEEP mode to the DEEP SLEEP mode.

(3) SLEEP Mode→DEEP SLEEP Mode (FIG. 11)

FIG. 11 is a flowchart showing a sequence to enter the DEEP SLEEP mode from the SLEEP mode.

In step S1201, it is determined whether neither packet addressed to the printing apparatus 2 nor a WAKEUP packet has been received nor an operation has been performed on the printing apparatus 2 within a predetermined time in the SLEEP mode. In other words, it is determined whether a condition capable of shifting to the DEEP SLEEP mode has been satisfied. If the condition has been satisfied, the process advances to step S1202, and the printing apparatus 2 starts processing to enter the DEEP SLEEP mode.

In step S1202, the link states of the PCI Express transmission paths 118 and 119 shift to L0. In step S1203, the controller 105 controls the LAN controller 104 to change the device state to D3cold.

In step S1204, the controller 105 issues a DLLP packet PM_Enter_L2 to the switch 103, and the switch 103 sends back a response packet PM_Request_Ack to the DLLP packet. In response to this, the link state of the PCI Express transmission path 119 shifts to L2. Similarly, the switch 103 performs the same processing as the above-described one for the LAN controller 104, and the link state of the PCI Express transmission path 118 shifts to L2.

In step S1205, the controller 105 controls the power control unit 111 via the power control line 115 to stop power supply to the printer controller 121. In this state, the printing apparatus 2 enters the DEEP SLEEP mode. At this time, power is supplied to part of the LAN controller 104 separately from the power supply line 113 extending to the printer controller 121 so that a LAN packet can be received in the DEEP SLEEP mode.

In this way, power supply to the respective controller units except for part of the LAN controller for coping with reception of a LAN packet stops. The DEEP SLEEP mode implements much more reduction of power consumption than in the SLEEP mode. In the DEEP SLEEP mode, power is supplied even to the power control unit 111.

Figure 12:
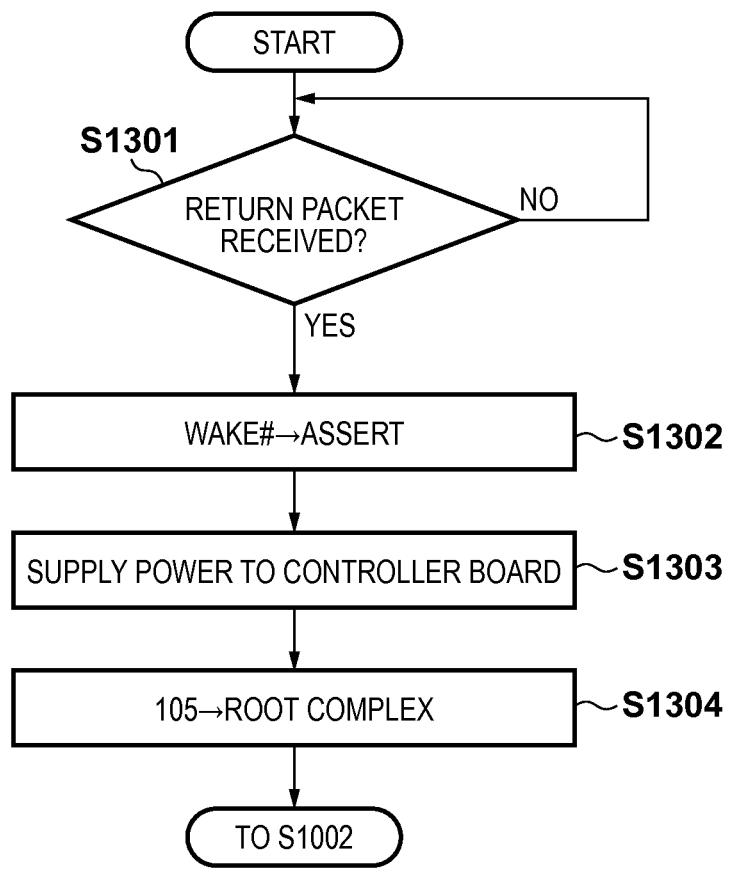
FIG. 12 is a flowchart showing shift processing from the DEEP SLEEP mode to the SLEEP response mode.

(4) DEEP SLEEP Mode→SLEEP Response Mode (FIG. 12)

FIG. 12 is a flowchart showing response processing to a host interface and handling of a print job in the DEEP SLEEP mode.

The state of the transmission path 119 is L2, and the device states of the switch 103 and LAN controller 104 are D3cold. At this time, assume that the LAN controller 104 is set to return from D3cold if it receives a packet addressed to the printing apparatus 2 or a WAKEUP packet. Under this environment, the process waits for reception of a LAN packet from the host in step S1301. If the packet received by the LAN controller 104 is a packet addressed to the printing apparatus 2 or a WAKEUP packet, the process shifts to step S1302; if NO in step S1301, the packet is ignored and the process waits for a packet addressed to the printing apparatus 2 or a WAKEUP packet.

In step S1302, the LAN controller 104 asserts the WAKE# signal 124 different from the PCI Express signal to the controller 105 and power control unit 111. As described above, the power control unit 111 receives power supply even in the DEEP SLEEP mode, similar to part of the LAN controller 104. In step S1303, when the WAKE# signal 124 is asserted, the power control unit 111 supplies power to the printer controller 121 via the power supply line 113.

In step S1304, the printer controller 121 executes an initialization sequence, and the controller 105 recognizes that the WAKE# signal 124 has been asserted to return from the DEEP SLEEP mode. Thus, the controller 105 is activated as a root complex. In this state, the printing apparatus 2 shifts to the SLEEP response mode.

If the WAKE# signal 124 has not been asserted, the controller 105 is activated as an endpoint. For example, when the power switch arranged on the operation panel 12 is turned on, the WAKE# signal 124 is not asserted. Note that when the power switch is turned on the DEEP SLEEP mode, the WAKE# signal 124 is not asserted. Thus, the controller 105 is activated as an endpoint.

In practice, the operation mode returns from the DEEP SLEEP mode to the SLEEP response mode by executing the same sequence as that from step S1002 of FIG. 10. At this time, if a packet received in step S1301 is a print job, the print job can be coped with by executing the same sequence as that from step S1008 of FIG. 10.

According to the above-described embodiment, even a printing apparatus which employs a PCI Express architecture can shift to the power saving mode and return from it. Power consumption is large especially in a printing apparatus which prints on a large-size printing medium as shown in FIGS. 1A and 1B. Therefore, the use of the configuration in the embodiment has a significant effect on power reduction.

Note that the above-described embodiment has exemplified a control configuration in which the operation mode shifts from the SLEEP mode to the normal mode upon receiving a print job. However, the present invention is not limited to this embodiment. For example, when it is determined that the contents of data contained in a packet are R, G, and B multi-valued data, no power may be supplied to the accelerator controller 101. When it is determined that the contents of data contained in a packet are data of the page description language, power may be supplied to the accelerator controller 101. This is because if the data contents are R, G, and B multi-valued data, the controller 105 can sufficiently execute data processing. In this case, the controller 105 operates as a root complex, converts R, G, and B multi-valued data into C, M, Y, and K binary data, and transfers the C, M, Y, and K binary data to the engine controller 107.

In the above-described embodiment, the printing apparatus is a color printer which employs an inkjet printing method and prints on a printing medium of a large size such as A0 or B0. However, the present invention is not limited to this. For example, the printing apparatus may be replaced with a printing apparatus of another printing method such as a laser beam printer, a copying apparatus, or the like, or may be an inkjet printing apparatus which prints on an A4- or A3-size printing medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-019142, filed Jan. 31, 2011, which is hereby incorporated by reference herein in its entirety.

What is claimed is:

1. An image processing apparatus including a Peripheral Component Interconnect Express bus, comprising:
a first controller configured to switchably operate as either a root complex or an endpoint of Peripheral Component Interconnect Express and perform control of the image processing apparatus and first processing for data;
a second controller, connected to said first controller via the Peripheral Component Interconnect Express bus, configured to, upon receiving power supply, be operated as a single root complex in the image processing apparatus and to be exclusively used for performing second processing for data;
a printing unit configured to print on a printing medium;
a setting unit configured to set said first controller as a single root complex in the image processing apparatus or an endpoint, and
a shifting unit configured to shift an operation mode to a sleep mode in a case where no data has been received, or no operation has been performed on the image processing apparatus within a predetermined time,
wherein while said second controller receives power supply, said first controller is operated as an endpoint of the Peripheral Component Interconnect Express by setting of said setting unit, and said second controller is operated as a single root complex in the image processing apparatus,
in a case where power supply to said second controller and said printing unit is turned off, said first controller is operated as a single root complex in the image processing apparatus by setting of said setting unit, and
in a case where said second controller operates as a single root complex in the image processing apparatus, the data for which the second processing has been performed is transferred from said second controller to said first controller via the Peripheral Component Interconnect Express bus.

2. The image processing apparatus according to claim 1, further comprising a transfer unit configured to transfer data input from an external apparatus to said first controller or said second controller.

3. The image processing apparatus according to claim 1, further comprising a power control unit configured to control power supply to said second controller,
wherein said setting unit is further configured to monitor a content of data received by said image processing apparatus, and if data of a predetermined content has not been received within a predetermined time, instruct said power control unit to stop power supply to said second controller.

4. The image processing apparatus according to claim 1, further comprising a power control unit configured to control power supply to said second controller,
wherein said setting unit is further configured to monitor a content of data received by said image processing apparatus, and if data of a predetermined content is received, instruct said power control unit to start power supply to said second controller.

5. The image processing apparatus according to claim 1, further comprising a switch connected to said first controller and said second controller via a Peripheral Component Interconnect Express bus.

6. The image processing apparatus according to claim 1, further comprising a power switch configured to designate power supply to said first controller and said second controller, and wherein in a case where said power switch is turned on, said setting unit is further configured to set said first controller as an endpoint of the Peripheral Component Interconnect Express.

7. The image processing apparatus according to claim 5, wherein said setting unit is further configured to set said switch via a signal line different from the Peripheral Component Interconnect Express bus.

8. The image processing apparatus according to claim 1, wherein said printing unit prints on a printing medium, based on data processed by said first controller.

9. The image processing apparatus according to claim 3, wherein the data of a predetermined content is print data.

10. The image processing apparatus according to claim 1, wherein if the first controller is operated as a single root complex of the Peripheral Component Interconnect Express in the image processing apparatus and the data does not include print data, the first controller sends back a response packet.

11. The image processing apparatus according to claim 1, wherein the first controller converts multi-valued color component data into binary color component data as the first processing for data.

12. The image processing apparatus according to claim 4, wherein the data of a predetermined content is print data.

13. The image processing apparatus according to claim 3, wherein the data of a predetermined content is data of page description language.

14. The image processing apparatus according to claim 4, wherein the data of a predetermined content is data of page description language, and
wherein if multi-valued data is received, said setting unit does not instruct said power control unit to start power supply to said second controller.

15. The image processing apparatus according to claim 1, wherein in a case where print data is received, said second controller performs process for the print data, and said first controller performs process for the print data processed by said second controller.

16. The image processing apparatus according to claim 15, wherein in a case where print data is received, said second controller performs decryption processing and interpretation of page description language to generate multi-valued data from the print data, and said first controller generates binary data from the multi-valued data.

17. The image processing apparatus according to claim 2, wherein said transfer unit transfers the data input from the external apparatus to said first controller if said first controller operates as a single root complex of the Peripheral Component Interconnect Express in the image processing apparatus, and transfers the data to said second controller if said second controller operates as a single root complex of the Peripheral Component Interconnect Express in the image processing apparatus.

18. The image processing apparatus according to claim 2, wherein said transfer unit includes an interface unit configured to receive a packet containing the data.

19. The image processing apparatus according to claim 1, wherein a Peripheral Component Interconnect Express unit of said first controller includes a register, and the root complex and the endpoint in said first controller are switchable based on a setting of the register.

20. The image processing apparatus according to claim 5, wherein said setting unit changes a setting of a port of said switch.

21. The image processing apparatus according to claim 1, further comprising an engine controller configured to control said printing unit so as to print on a printing medium, based on data transferred from said first controller.

* * * * *